(12) United States Patent
Bigham et al.

(10) Patent No.: US 11,789,528 B1
(45) Date of Patent: *Oct. 17, 2023

(54) ON-THE-FLY CALIBRATION FOR IMPROVED ON-DEVICE EYE TRACKING

(71) Applicant: Apple Inc., Cupertino, CA (US)

(72) Inventors: Jeffrey P. Bigham, Pittsburgh, PA (US); Mingzhe Li, Seattle, WA (US); Samuel C. White, Merritt Island, FL (US); Xiaoyi Zhang, Seattle, WA (US); Qi Shan, Seattle, WA (US); Carlos E. Guestrin, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,367

(22) Filed: Aug. 30, 2021

Related U.S. Application Data

(63) Continuation of application No. 17/027,266, filed on Sep. 21, 2020, now Pat. No. 11,106,280.

(60) Provisional application No. 62/902,850, filed on Sep. 19, 2019.

(51) Int. Cl.
*G06F 3/01* (2006.01)
*G06V 40/19* (2022.01)
*G06V 40/60* (2022.01)

(52) U.S. Cl.
CPC .............. *G06F 3/013* (2013.01); *G06V 40/19* (2022.01); *G06V 40/67* (2022.01)

(58) Field of Classification Search
CPC ......... G06F 3/013; G06V 40/19; G06V 40/67
See application file for complete search history.

(56) References Cited

U.S. PATENT DOCUMENTS

| | | |
|---|---|---|
| 2014/0320397 A1 | 10/2014 | Hennessey |
| 2015/0331485 A1 | 11/2015 | Wilairat |
| 2017/0360295 A1 | 12/2017 | Oz |
| 2018/0095616 A1 | 4/2018 | Valdivia |
| 2018/0284886 A1 | 10/2018 | Mardanbegi |
| 2018/0308252 A1 | 10/2018 | Alonso |
| 2019/0018485 A1 | 1/2019 | Aleem |
| 2020/0364539 A1 | 11/2020 | Anisimov |

*Primary Examiner* — Abhishek Sarma
(74) *Attorney, Agent, or Firm* — Blank Rome LLP

(57) ABSTRACT

Calibration of eye tracking is improved by collecting additional calibration pairs when user is using apps with eye tracking. A user input component is presented on a display of an electronic device, detecting a dwelling action for user input component, and in response to detecting the dwelling action, obtaining a calibration pair comprising an uncalibrated gaze point and a screen location of the user input component, wherein the uncalibrated gaze point is determined based on an eye pose during the dwelling action. A screen gaze estimation is determine based on the uncalibrated gaze point, and in response to determining that the calibration pair is a valid calibration pair, training a calibration model using the calibration pair.

20 Claims, 6 Drawing Sheets

ON-THE-FLY CALIBRATION FOR IMPROVED ON-DEVICE EYE TRACKING

BACKGROUND

This disclosure relates generally to the field of eye tracking, and more particularly to on-the-fly calibration for improved on-device eye tracking.

Eye tracking and gaze estimation on mobile devices provide users another dimension of input. Eye tracking also enables hands-free interaction. Under some circumstances, gaze input can be more attractive than other modalities, such as touch (which may be limited, for example while cooking or driving), and voice (not suitable for noisy/crowded situations). Lots of research has built upon improving the accuracy and precision of gaze estimation through various approaches. Prior techniques for eye tracking and gaze estimation utilized additional external hardware due to the limitation of computational power, battery life, and camera resolution. More recent research involves investigating the eye tracking and gaze estimation on unmodified mobile devices through both geometric models of facial gestures and machine learning approach by mapping eye images to gaze coordinates. However, most of these approaches report accuracy and precision by having users fixate their gaze points on screen stimuli.

Calibration is an important step to map signals from eyes to screen. In general, the gaze estimation will be more reliable when more valid points are collected, but collection of calibration points may be a burden to a user, and may require significant computational resources. What is needed is a hands-free on-the-fly calibration technique for improving accuracy while reducing the burden of explicit recalibration.

SUMMARY

In one embodiment a method for improved calibration for on-device eye tracking is described. The method includes presenting a user input component on a display of an electronic device, detecting a dwelling action for user input component, and in response to detecting the dwelling action, obtaining a calibration pair comprising an uncalibrated gaze point and a screen location of the user input component, wherein the uncalibrated gaze point is determined based on an eye pose during the dwelling action. A screen gaze estimation is determine based on the uncalibrated gaze point, and in response to determining that the calibration pair is a valid calibration pair, training a calibration model using the calibration pair.

In another embodiment, the method may be embodied in computer executable program code and stored in a non-transitory storage device. In yet another embodiment, the method may be implemented in an electronic device.

DETAILED DESCRIPTION

Figure 1:
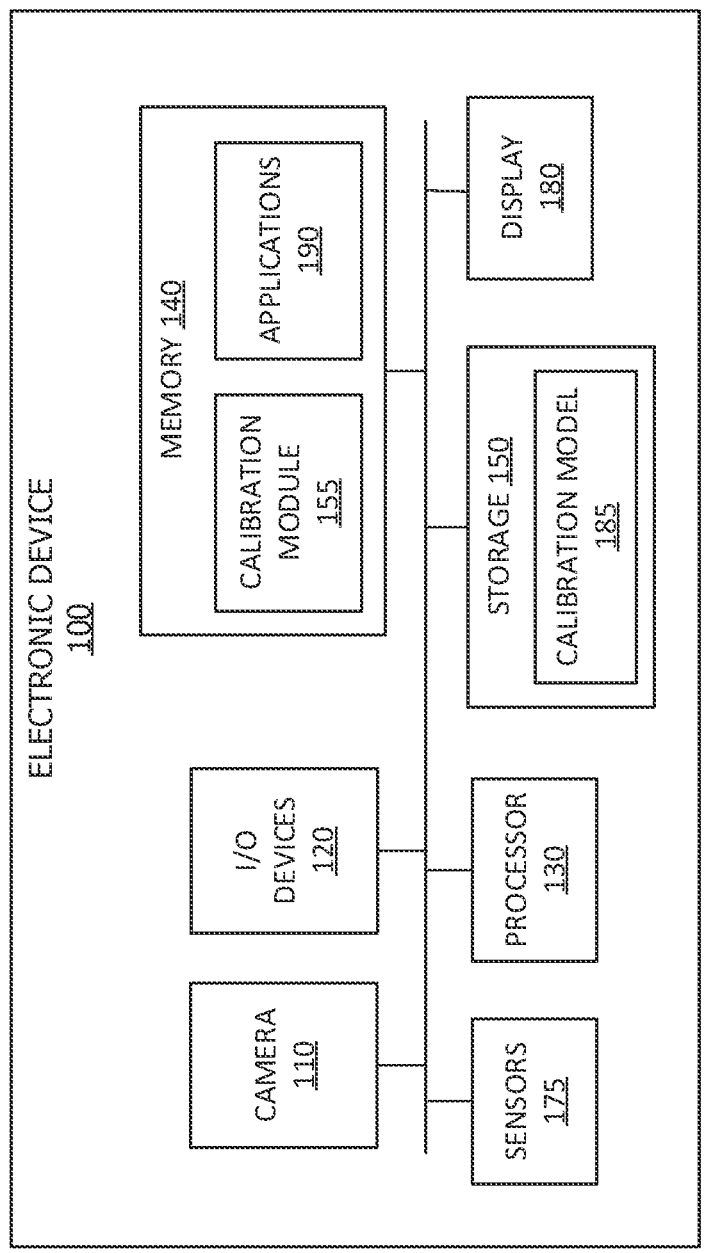
FIG. 1 shows, in block diagram form, a simplified electronic device according to one or more embodiments.

This disclosure pertains to systems, methods, and computer readable media for a technique for improving on-the-fly calibration for on-device eye tracking. In one or more embodiments, the described technique utilizes a regression model for using multiple calibration points, gaze moving, and interaction techniques for error robustness. Techniques include a real-time gaze estimator that leverages users input to continuously calibrate on the fly on unmodified devices. In addition, techniques described herein include a calibration technique which only requires eye gaze as input, without mouse or keyboard input as confirmation.

Eye tracking may be calibrated in real time by utilizing stimuli marks overlaid onto a user interface, such as a user interface for an application on a mobile device. According to one or more embodiments, baseline data may be obtained by presenting one or more initial stimuli marks on the screen and prompting a user to select the one or more stimuli marks by gazing at the one or more stimuli marks. By obtaining gaze information, such as a screen location for the gaze point, ground truth calibration data can be obtained.

In one or more embodiments, the eye tracking system may be calibrated in real time by overlaying the stimuli marks onto user input components presented on a display as part of the user interface, as a user gazes on or around the components. For example, user input components may include icons, buttons, selectable text, and other components presented on a user interface whose selection may trigger further action by the device. A dwelling action may be detected by the device when a user's gaze is determined to be focused on a point on the screen. In response to detecting the dwelling action, a stimulus mark may be overlaid onto the user interface component to prompt a user to look at the mark. In one or more embodiments, the mark may change presentation in response to confirmation of selection of the component. The selection may be confirmed by the user, for example, by gazing at or near the mark for a predetermined amount of time, presenting a predetermined gesture or expression, or the like. A calibration pair may be obtained, which includes an uncalibrated gaze point and a stimulus mark location associated with the gaze. A screen gaze estimation may be determined based on the uncalibrated gaze point, for example, using a pre-trained calibration model. In one or more embodiments, the system may determine whether the calibration pair is a valid calibration pair. For example, the calibration pair may be considered a valid calibration pair when the calibration pair renders the calibration model more accurate than the calibration model without the calibration pair. If the calibration pair is valid, then the calibration model is trained using the valid calibration pair.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of an electronic device 100 is depicted in accordance with one or more embodiments of the disclosure. Electronic device 100 may be part of the multifunctional device, such as a mobile phone, tablet computer, personal digital assistant, portable music/video player, or any other electronic device that includes a camera system and is configured for eye tracking. Further, electronic device 100 may be part of a larger system of components that includes a camera 110 and display 180. Electronic device 100 may be connected to other devices across the network such as a network device, mobile device, tablet devices, desktop devices, as well as network storage devices such as servers and the like. Electronic device 100 may be configured to capture image data corresponding to a scene and use the captured image data to render views on the display 180 viewable by a user.

Electronic device 100 may include one or more sensors 175, which may provide information about the surrounding environment, such as contextual information. For example, sensors 175 may include sensors configured to detect brightness, depth, location, and other information regarding the environment. Electronic device 100 may also include a display 180, which may be an additive display. For example, display 180 may be a transparent or semi-opaque display, such as a heads up display, by which an image may be projected over a transparent surface. Thus, display 180 may be comprised of a projector and the surface, or may just include the projector. Further, display 180 may be a transparent display, such as an LCD display and/or head mounted display. Electronic device 100 may additionally include I/O devices 120, such as speakers and the like. In one or more embodiments, the various I/O devices 120 may be used to assist in image capture, or usability of applications on the device. According to one or more embodiments, I/O devices 120 may additionally include a touch screen, mouse, trackpad, and the like.

Electronic device 100 may include a processor 130. Processor 130 may be a central processing unit (CPU). Processor 130 may alternatively, or additionally, include a system on chip such as those found in mobile devices and include zero or more dedicated graphics processing units (GPUs). Electronic device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution, including calibration module 155 or other applications 190. In one or more embodiments, storage 150 may comprise cache, ROM, RAM, and/or nonvolatile memory, and may store data and other components utilized for eye tracking, such as calibration model 185. Calibration model 185 may be, for example, a regression model which is trained to receive as input an uncalibrated gaze point and output a gaze estimation on the screen. As such, calibration model 185 may predict where a user is gazing on the screen based on uncalibrated gaze point data.

Memory 140 may include instructions, such as computer readable code, executable by processor 130 to cause various actions to be performed. For example, calibration module 155 may be utilized to refine on device by tracking on the fly. In one or more embodiments, calibration module 155 obtains eye tracking data while a user is interacting with electronic device 100, for example using applications 190, to refine calibration model 185.

Figure 2:
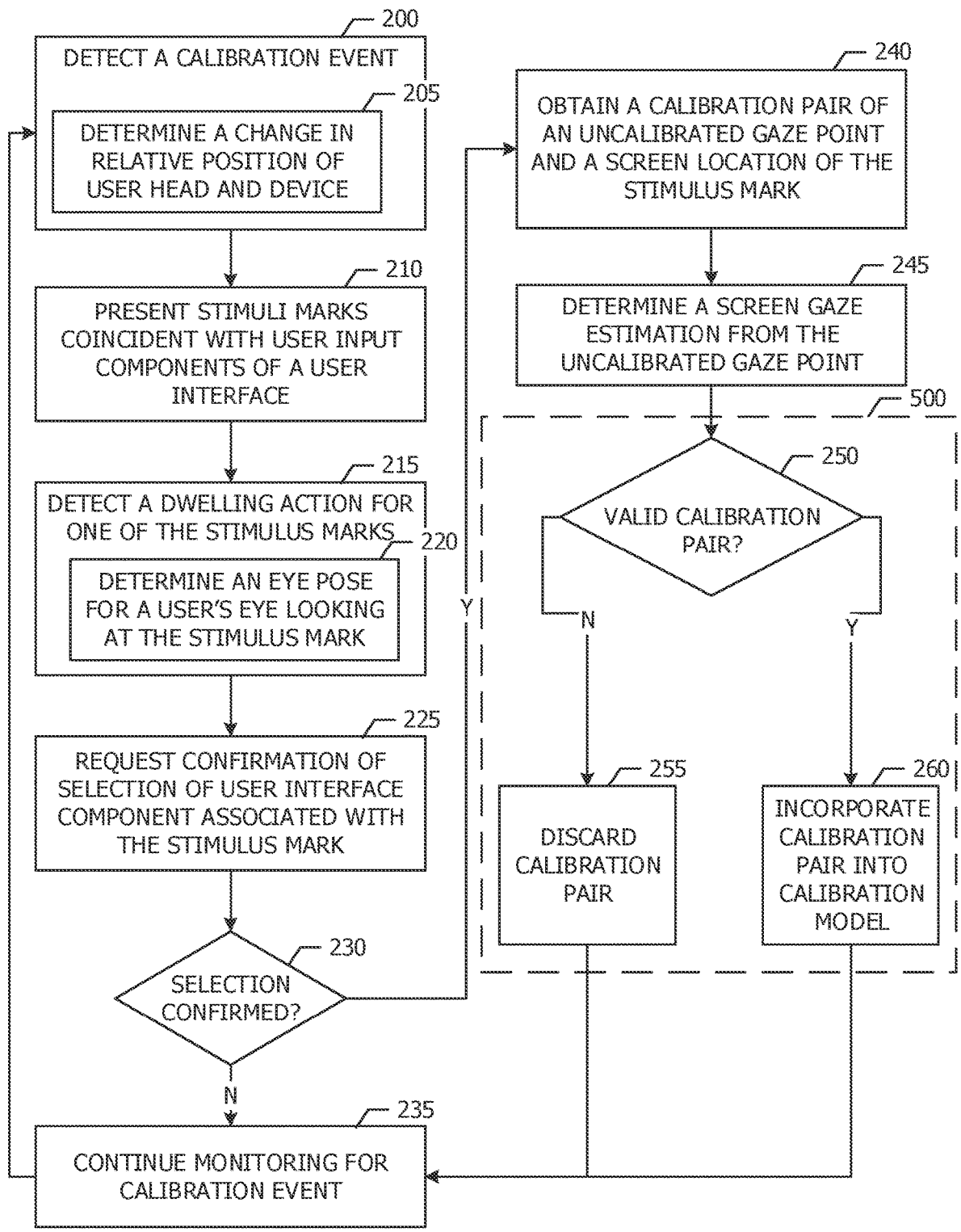
FIG. 2 shows, in flowchart form, a method for on-the-fly calibration of eye tracking on an electronic device, according to one or more embodiments.

FIG. 2 shows, in flowchart form, a method for on-the-fly calibration of eye tracking on an electronic device, according to one or more embodiments. With respect to each of the flowchart described below (e.g., FIGS. 2-3, 5), although the various actions are depicted in a particular order, in some embodiments the various actions may be performed in a different order. In one or more embodiments, two or more of the actions may occur simultaneously. According to one or more embodiments, some of the actions may not be required or other actions may be included. For purposes of clarity, the flowchart will be described respect to the various components of FIG. 1. However, it should be understood that the various actions may be taken by alternative components, according to one or more embodiments.

Although not depicted, and initial calibration may take place. The initial calibration may include a directed process to determine ground truth calibration data.

As an example, in one or more embodiments, some number of directed calibration marks may be presented on a display screen. A user may be directed to gaze at each calibration mark for some time. Eye vectors and precise facial landmarks may be obtained by the device during the gaze. From the eye vectors and precise facial landmarks, the system may determine an eye pose, such as a position and orientation of each eye in real time. Using the position and orientation of each eye, hit testing may be performed for each eye to the screen plane using a transform matrix, resulting in a hit location for each eye. In one or more embodiments, the two hit locations may be averaged to find an uncalibrated gaze point. The uncalibrated gaze point may then be mapped to the screen. In one or more embodiments, a calibration pair for each of the initial calibration marks may be obtained, which consist of the uncalibrated gaze point and the location of the calibration mark on the screen.

Using the calibration pair for each calibration mark the system may calculate a marker for the transformation matrix, with coefficients that best fit the points. Then, a homography matrix can transform future uncalibrated gaze points to a gaze estimation on screen. In one or more embodiments, the initial calibration system may show a cursor to indicate gaze estimation on the screen, which provides visual feedback to the users when the user interacts with the screen content. To make the gaze cursor smoother, a Kalman filter may be applied to reduce the impact of noise and saccades. Once the user is on target, selection of the target may be confirmed using hands-free input techniques or considerations, including dwell time, facial gestures or expressions, eye gestures, and the like.

The flowchart begins at block 200, where the calibration module 155 detects a calibration event. In one or more embodiments, a calibration event may be any event which indicates to the calibration module 155 that calibration data should be collected. The calibration event may be automatically determined, determined based on user input, or a combination thereof. As an example, as shown at block 205, a change in relative position of a user's head and the device may be detected as a calibration event. Whenever a user is present in front of the camera 110, the calibration module 155 may automatically generate transform matrices in real time. If a relative position between the electronic device 100 and the user is changed, for example because of the head movement, the calibration module 155 may determine that the eye tracking should be recalibrated. In one or more embodiments, a substantial change in head pose, such as a difference in pose that satisfies a predetermined threshold, may trigger the initial calibration process to be performed as described above.

The flowchart continues at block 210, where the calibration module 155 presents stimuli marks coincident with user input components of a user interface. The stimuli marks may be presented coincident with user input components of a user interface of any application, according to some embodiments. As such, the calibration process may be performed with minimal interruption to the user experience. In some embodiments, the stimuli marks may be presented as part of a user input component, such as an icon or button. For example, the stimuli marks may be overlaid on preexisting user input components. As another example, the stimuli marks may be presented in a manner as to replace the preexisting user input components. The stimuli marks may be presented, for example, as squares, dots, other shapes, and the like which provide a target for a user's gaze for selection of the component. As such, stimuli marks may be overlaid over the pre-existing user interface supplied by applications 190. The presentation of stimuli marks will be described in greater detail below with respect to FIG. 4.

At block 215, the calibration module 155 detects a dwelling action for one of the user input components. In one or more embodiments, determination of the dwelling action for the stimulus mark may be obtained in a number of ways. For example, a "bubble cursor" type approach may be utilized, in which a target closest to the cursor where the gaze is located is selected as the selected target. As such, a bubble cursor can provide some tolerance to the target selection so that users can use imperfect gaze estimation to interact with applications.

At 220, an eye pose is determined for a user's eye looking at the stimulus mark. In one or more embodiments, the eye pose may be determined for one or both of the left and right eyes of the user. The eye pose may be determined as a position and orientation of the eye, and may be determined with respect to a common coordinate system of the electronic device 100.

The flowchart continues at 225 where the calibration module 155 requests confirmation of selection of the user interface component associated with the stimulus mark. In one or more embodiments, the request may be an overt request such as a prompt on the screen. Alternatively, or additionally, the request may be an indication on the interface that the user is selecting the particular user interface component. As an example, at block 225, the calibration mark may present a stimulus mark coincident with the user interface component. In one or more embodiments, the stimulus mark may change presentation when a user gazes within a predetermined distance of the calibration mark, and may change presentation again when the user has dwelled within a predetermined distance of the mark and/or performed another selection action, such as a particular facial expression, indicating selection of the element has occurred.

The flowchart continues at block 230, where a determination occurs regarding whether a selection action is confirmed. If, at block 230 a determination is made that selection has not occurred, for example if the user shifts gaze away from the target area, then the flowchart continues to block 235 and the calibration module 155 continues to monitor the user's gaze and/or the user position for a calibration event, as described at block 200.

Returning to block 230, if a determination is made that the selection is confirmed, then the flowchart continues to 240 where the calibration module 155 obtains a calibration pair of an uncalibrated gaze points at a screen location of the stimulus mark. According to one or more embodiments, the uncalibrated gaze point refers to an uncalibrated gaze point at which the user's gaze impinges the plane of the display, without respect to a location on the screen. The screen location of the stimulus mark may be a location on the screen associated with the stimulus mark.

The flowchart continues at block 245 where a screen gaze estimation is determined from the uncalibrated gaze point. The screen gaze estimation may be determined, for example, using a prior determined calibration model to calibrate the uncalibrated screen gaze into a screen gaze estimation.

At block 250, a determination is made regarding whether the pair is a valid calibration pair. The determination as to whether the pair is a valid calibration pair is described in greater detail with respect to FIG. 5 and flowchart 500. In general, determining whether the pair is a valid calibration pair includes determining whether inclusion of the calibration pair into the calibration model provides improved results. If it is determined at block 250 that the calibration pair is not a valid calibration pair, then the flowchart continues at block 255 and the current calibration pair is discarded, and thus not utilized to retrain the calibration model. Returning to block 250, if a determination is made that the current calibration pair is a valid calibration pair, then the flowchart continues at block 260 the current calibration pair is incorporated into the calibration model. Specifically, the calibration model may be retrained to include the calibration pair.

In one or more embodiments, the method described in FIG. 2 may be continuously or intermittently performed in order to continuously refine eye gaze estimation over time. Further, in one or more embodiments, once a calibration event is observed, such as a change in relative position between the user and the device, then new calibration pairs may be collected and potentially incorporated into the calibration model for some time, such as a predetermined time, or until the calibration model reaches a threshold consistency.

Figure 3:
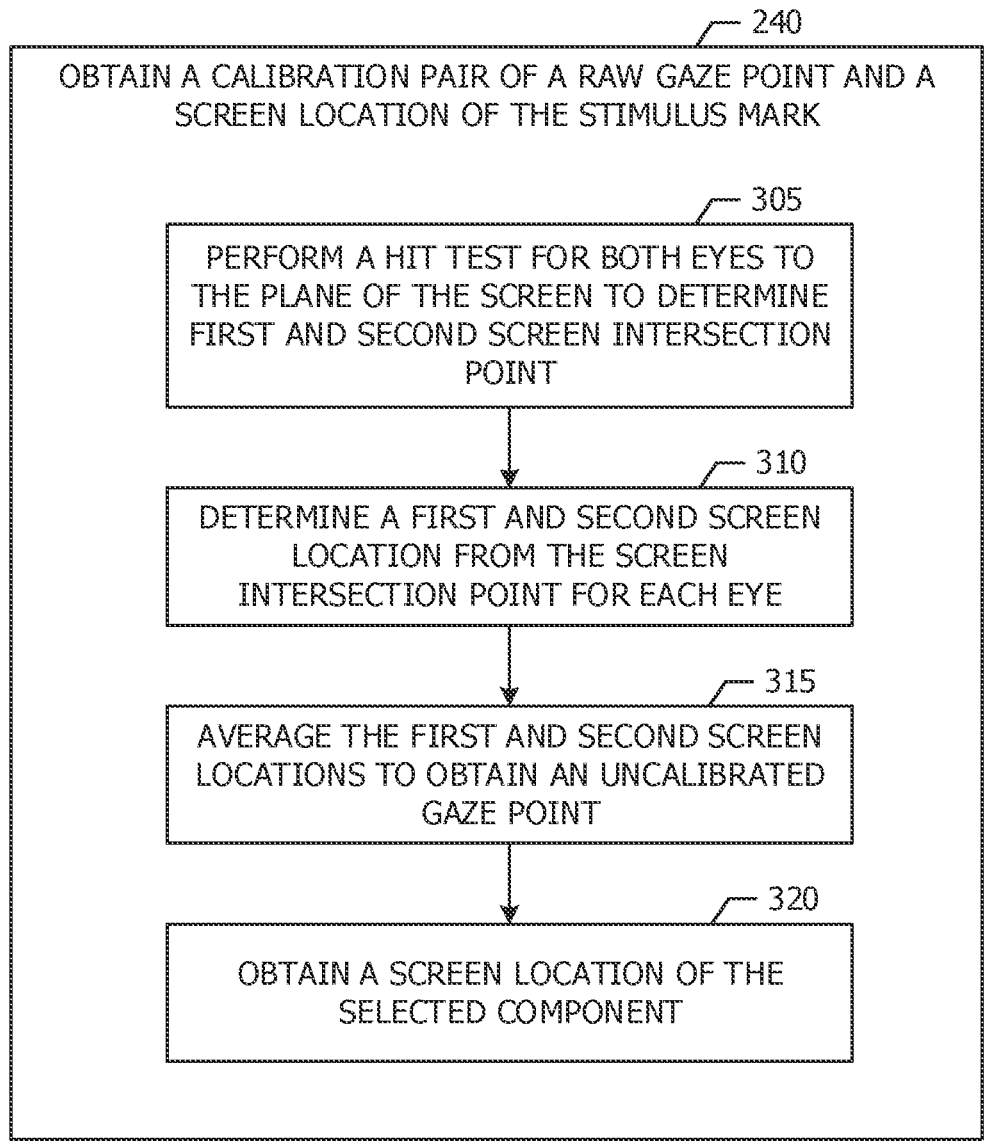
FIG. 3 shows, in flowchart form, a method for obtaining a calibration pair, according to one or more embodiments.

FIG. 3 shows, in flowchart form, a method for obtaining a calibration pair, as described with respect to block 240 of FIG. 2, according to one or more embodiments. The flowchart begins at 305 where the calibration module 155 performs a hit test for both eyes to the plane of the display screen to determine first and second intersection points. Then, at 310, screen locations on a display are determined for the first and second intersection points. At block 315, an uncalibrated gaze point is determined based on the first and second screen point locations. In one or more embodiments, the first and second screen point locations are averaged to obtain an uncalibrated gaze point. Finally, the flowchart concludes at 320 where the calibration module 155 obtains a screen location of the selected component.

Figure 4:
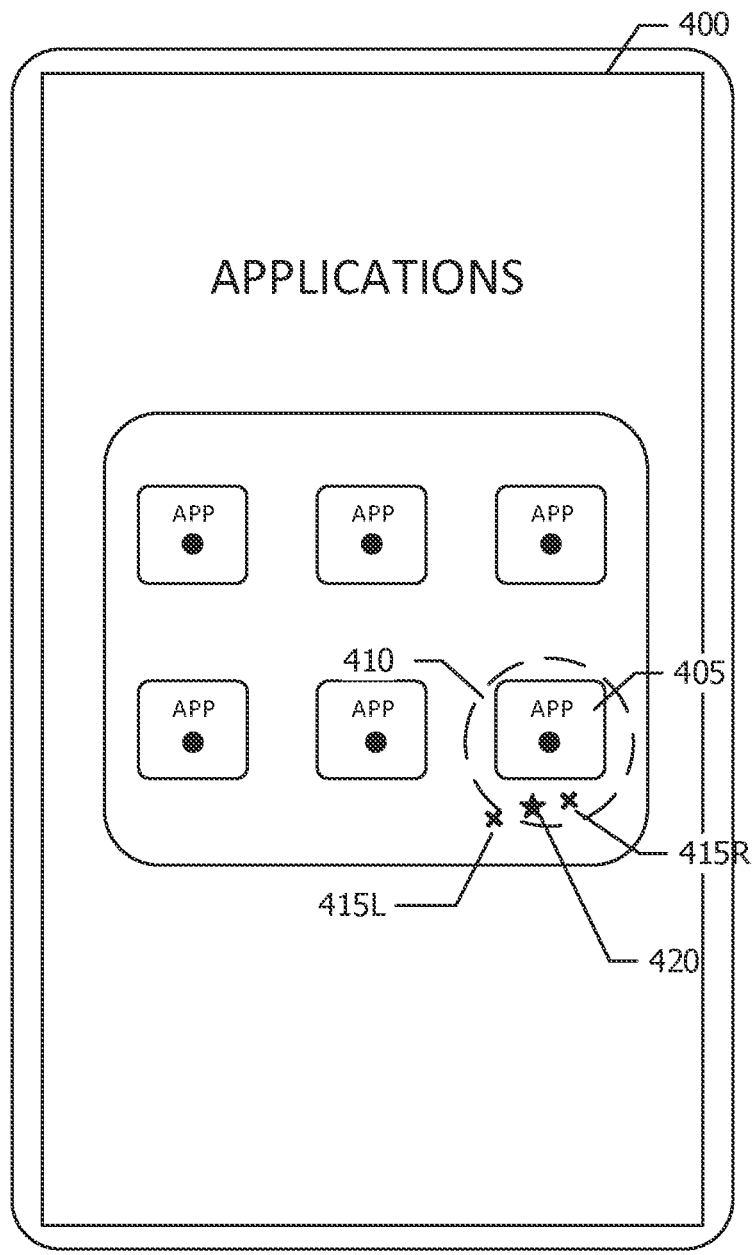
FIG. 4 shows an example user interface for on-the-fly calibration, in accordance with one or more embodiments.

FIG. 4 shows an example user interface, in accordance with one or more embodiments. As shown, user interface 400 may include a plurality of interactive components, such as interactive component 405. As shown, interactive component 405 represents a button by which a particular application may be selected. As described above with respect to block 305, the calibration module 155 may perform a hit test of each of a left and right eye of the user, thus obtaining first and second screen intersection points. As such, hit location 415L represents the first screen intersection point (for example, for a left eye), whereas hit location 415R represents the second screen intersection point (for example, for a right eye).

According to one or more embodiments, the first and second screen intersection points 415L and 415R may be averaged or otherwise combined to identify an uncalibrated gaze point, and then then calibrated using a calibration model to determine a screen gaze estimation 420. In one or more embodiments, the calibration pair that includes the screen gaze estimation and the location of the selected component may be compared to determine, for example, if the calibration pair is valid. In one or more embodiments, one technique for determining whether the calibration pair is valid is determining whether the location of the screen gaze estimation is within a predetermined distance threshold 410 of the stimulus mark and/or input component associated with the stimulus mark. According to one or more embodiments, a "bubble" type cursor may be used to determine whether the estimated eye gaze is within a predetermined distance of the input component and/or stimulus mark associated with the input component.

Figure 5:
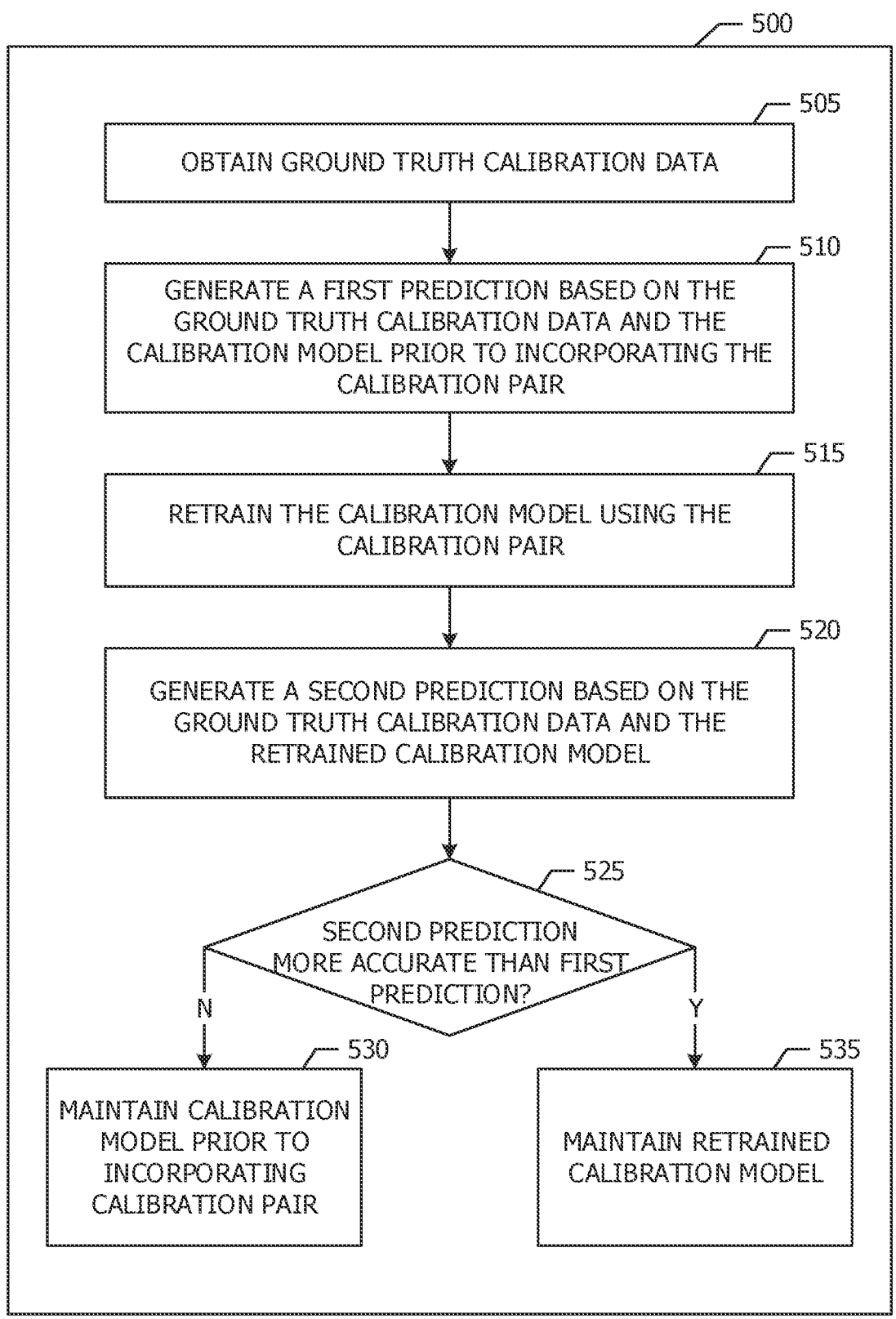
FIG. 5 shows, in flowchart form, a method for training a calibration model, according to one or more embodiments.

FIG. 5 shows, in flowchart form, a method for training a calibration model, according to one or more embodiments.

The flowchart begins at 505 where ground truth calibration data is obtained. As described above, a user may initially calibrate a device using a startup sequence in which the user is prompted to gaze at particular calibration prompts to train an initial calibration model. In one or more embodiments, the ground truth calibration data may include the uncalibrated gaze points and the associated screen location for each calibration mark.

The flowchart continues at 510 where the calibration module 155 generates a first prediction based on the ground truth calibration data and the calibration model prior to incorporating the current calibration pair. In one or more embodiments, the calibration model utilized at 510 may be a calibration model as it was initially trained, or was most recently trained, without inclusion of the current calibration pair.

At 515, the calibration module 155 retrains the prior calibration model from block 520 to include the current calibration pair. As described above, the calibration model may be, for example, a regression model which is trained to receive as input an uncalibrated gaze point and output a gaze estimation on the screen. As such, calibration model 185 may predict where a user is gazing on the screen based on uncalibrated gaze data. Accordingly, re-training the model may provide different predictions to given input than the model prior to re-training. The flowchart continues at 520 where the calibration module 155 generates a second prediction based on the ground truth calibration but based on the retrained calibration model from 515.

A determination is made at block 525 regarding whether the second prediction is determined to be more accurate than the first prediction based on the ground truth calibration data. In one or more embodiments, if the second prediction is more accurate than the first prediction, then the retrained model using the current calibration pair is an improved model. As such, if a determination is made at 525 that the second prediction is not more accurate than the first prediction, then at 530 the calibration model maintains the calibration model from block 510, prior to incorporation of the current calibration pair. Returning to block 525, if the calibration module 155 determines that the second prediction is more accurate than the first prediction, then the flowchart continues to block 535 where the calibration module 155 maintains the retrained model form block 515, which has been retrained to incorporate the current calibration pair.

Figure 6:
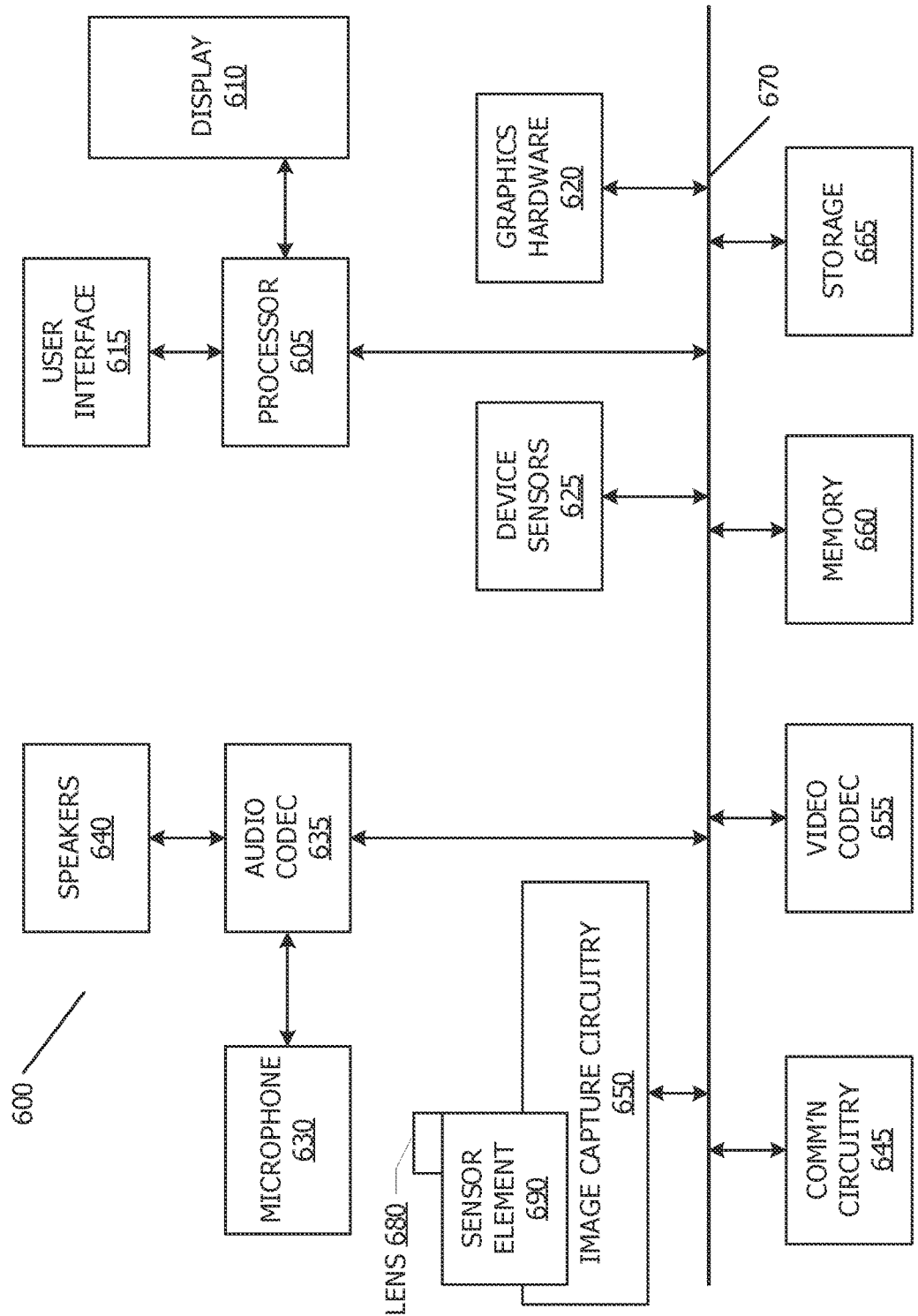
FIG. 6 depicts a sample simplified multifunctional device in a block diagram form, according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, a tablet computer, or a head mounted device.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680 associated with sensor element 690. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system comprising:
   one or more processors; and
   one or more non-transitory computer readable media comprising computer readable code executable by the one or more processors to:
      present a user interface on a display of an electronic device;
      detect, during presentation of the user interface, a calibration event;
      in response to detecting the calibration event:
         determine an interactive component displayed within the user interface, and
         present a stimulus mark coincident with the interactive component;
      determine a calibration pair comprising an uncalibrated gaze point at a screen location of the display and a screen location of the stimulus mark; and
      modify a presentation of the stimulus mark.

2. The system of claim 1, further comprising computer readable code to further modify the presentation of the stimulus mark to indicate confirmation of selection of a corresponding interactive component.

3. The system of claim 2, further comprising computer readable code to confirm the selection of the corresponding interactive components in accordance with detecting a dwelling action targeted toward the stimulus mark.

4. The system of claim 1, wherein the computer readable code to determine the uncalibrated gaze point comprises computer readable code to:
   determine a threshold distance associated with the stimulus mark,
   wherein the calibration pair is determined in accordance with a determination that the screen location of the uncalibrated gaze point is within the threshold distance of the stimulus mark.

5. The system of claim 1, further comprising computer readable code to determine a screen gaze estimation based on the uncalibrated gaze point and a calibration model.

6. The system of claim 5, further comprising computer readable code to:
   obtain ground truth calibration data;
   generate, by the calibration model, a first prediction based on the ground truth calibration data;
   generate a modified calibration model including the calibration pair;
   compare performance of the calibration model and the modified calibration model based on the ground truth calibration data; and
   in response to determining that a prediction of the modified calibration model is improved over the calibration model, replacing the calibration model with the modified calibration model.

7. A method comprising:
   presenting a user interface on a display of an electronic device;
   detecting, during presentation of the user interface, a calibration event;
   in response to detecting the calibration event:
      determining an interactive component displayed within the user interface, and
      presenting a stimulus mark coincident with the interactive component;
   determining a calibration pair comprising an uncalibrated gaze point at a screen location of the display and a screen location of the stimulus mark; and
   modifying a presentation of the stimulus mark.

8. The method of claim 7, further comprising:
   further modifying the presentation of the stimulus mark to indicate confirmation of selection of a corresponding interactive component.

9. The method of claim 8, further comprising confirming the selection of the corresponding interactive components in accordance with detecting a dwelling action targeted toward the stimulus mark.

10. The method of claim 7, wherein determining the uncalibrated gaze point comprises:
    determining a threshold distance associated with the stimulus mark,
    wherein the calibration pair is determined in accordance with a determination that the screen location of the uncalibrated gaze point is within the threshold distance of the stimulus mark.

11. The method of claim 7, wherein determining the uncalibrated gaze point comprises:
    performing a hit test for a first eye and a second eye based on a first eye pose and a second eye pose to obtain a first and second hit location on the display; and
    determining the uncalibrated gaze point based on the first and second hit locations.

12. The method of claim 7, further comprising determining a screen gaze estimation based on the uncalibrated gaze point and a calibration model.

13. The method of claim 12, further comprising:
obtaining ground truth calibration data;
generating, by the calibration model, a first prediction based on the ground truth calibration data;
generating a modified calibration model including the calibration pair;
comparing performance of the calibration model and the modified calibration model based on the ground truth calibration data; and
in response to determining that a prediction of the modified calibration model is improved over the calibration model, replacing the calibration model with the modified calibration model.

14. A non-transitory computer readable medium comprising computer readable code executable by one or more processors to:
present a user interface on a display of an electronic device;
detect, during presentation of the user interface, a calibration event;
in response to detecting the calibration event:
determine an interactive component displayed within the user interface, and
present a stimulus mark coincident with the interactive component;
determine a calibration pair comprising an uncalibrated gaze point at a screen location of the display and a screen location of the stimulus mark; and
modify a presentation of the stimulus mark.

15. The non-transitory computer readable medium of claim 14, further comprising computer readable code to further modify the presentation of the stimulus mark to indicate confirmation of selection of a corresponding interactive component.

16. The non-transitory computer readable medium of claim 15, further comprising computer readable code to confirm the selection of the corresponding interactive components in accordance with detecting a dwelling action targeted toward the stimulus mark.

17. The non-transitory computer readable medium of claim 14, wherein the computer readable code to determine the uncalibrated gaze point comprises computer readable code to:
determine a threshold distance associated with the stimulus mark,
wherein the calibration pair is determined in accordance with a determination that the screen location of the uncalibrated gaze point is within the threshold distance of the stimulus mark.

18. The non-transitory computer readable medium of claim 14, wherein the computer readable code to determine the uncalibrated gaze point comprises computer readable code to:
perform a hit test for a first eye and a second eye based on a first eye pose and a second eye pose to obtain a first and second hit location on the display; and
determine the uncalibrated gaze point based on the first and second hit locations.

19. The non-transitory computer readable medium of claim 14, further comprising computer readable code to determine a screen gaze estimation based on the uncalibrated gaze point and a calibration model.

20. The non-transitory computer readable medium of claim 19, further comprising computer readable code to:
obtain ground truth calibration data;
generate, by the calibration model, a first prediction based on the ground truth calibration data;
generate a modified calibration model including the calibration pair;
compare performance of the calibration model and the modified calibration model based on the ground truth calibration data; and
in response to determining that a prediction of the modified calibration model is improved over the calibration model, replace the calibration model with the modified calibration model.

\* \* \* \* \*